(12) United States Patent
Liu

(10) Patent No.: US 10,999,651 B1
(45) Date of Patent: May 4, 2021

(54) CUSTOMIZATION OF EMERGENCY NOTIFICATIONS FOR TELECOMMUNICATIONS SERVICES

(71) Applicant: 8x8, Inc., San Jose, CA (US)

(72) Inventor: Zhishen Liu, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 16/748,312

(22) Filed: Jan. 21, 2020

Related U.S. Application Data

(63) Continuation of application No. 16/013,387, filed on Jun. 20, 2018, now Pat. No. 10,547,916.

(60) Provisional application No. 62/524,164, filed on Jun. 23, 2017.

(51) Int. Cl.
| | |
|---|---|
| H04L 12/26 | (2006.01) |
| H04Q 3/10 | (2006.01) |
| H04L 29/06 | (2006.01) |
| H04M 3/42 | (2006.01) |
| H04M 7/00 | (2006.01) |
| H04Q 3/00 | (2006.01) |

(52) U.S. Cl.
CPC .......... *H04Q 3/10* (2013.01); *H04L 65/1056* (2013.01); *H04M 3/42153* (2013.01); *H04M 7/0054* (2013.01); *H04Q 3/0029* (2013.01); *H04M 2242/04* (2013.01); *H04M 2242/14* (2013.01)

(58) Field of Classification Search
None
See application file for complete search history.

(56) References Cited

U.S. PATENT DOCUMENTS

| | | | | |
|---|---|---|---|---|
| 8,019,358 B1* | 9/2011 | Ho | ......... | H04M 11/04 455/456.2 |
| 8,824,487 B1* | 9/2014 | Ray | ......... | H04L 12/66 370/401 |
| 8,948,358 B1* | 2/2015 | Rengarajan | ........... | H04M 7/006 379/121.03 |
| 10,298,751 B1* | 5/2019 | Liu | ...................... | H04W 64/006 |
| 2002/0131397 A1* | 9/2002 | Patel | ..................... | H04W 48/10 370/349 |
| 2004/0141508 A1* | 7/2004 | Schoeneberger | ....... | H04L 67/10 370/401 |

(Continued)

*Primary Examiner* — Eunsook Choi
(74) *Attorney, Agent, or Firm* — Crawford Maunu PLLC

(57) ABSTRACT

Certain aspects of the disclosure are directed to control of data communications services. According to a specific example, an apparatus is provided including one or more computer processor circuits configured and arranged to interface with remotely-situated client entities using a first programming language associated with a message exchange protocol between a data communications server and data sources, and to provide a database of communications services to the client entities. The apparatus further includes communications control circuitry configured and arranged to control communications routing for each respective client entity, by identifying, client-specific sets of control data derived from programming instructions received over the message exchange protocol and corresponding to a second programming language that is compatible with the first programming language, and providing the communications services to end-users of the client entity based on the client-specific sets of control data including particular routing functions for emergency notifications.

16 Claims, 6 Drawing Sheets

(56) References Cited

U.S. PATENT DOCUMENTS

| | | | | |
|---|---|---|---|---|
| 2010/0233991 A1* | 9/2010 | Crawford | .............. | H04L 45/306 |
| | | | | 455/404.1 |
| 2015/0100348 A1* | 4/2015 | Connery | ................ | G16H 40/67 |
| | | | | 705/3 |
| 2016/0345150 A1* | 11/2016 | Shim | ................... | H04W 64/006 |
| 2018/0053401 A1* | 2/2018 | Martin | ................... | G08B 31/00 |

* cited by examiner

CUSTOMIZATION OF EMERGENCY NOTIFICATIONS FOR TELECOMMUNICATIONS SERVICES

OVERVIEW

Aspects of various embodiments are directed to customization of emergency notifications for emergency communications and computing services. Data communications platforms have allowed individuals to transmit communications using broadband Internet connections in place of traditional telephone lines. A communications endpoint device can use a broadband Internet connection to connect to a data communications server that is managed by a communications service provider. The data communications server can handle communications routing and provide other communications services for the communications endpoint device.

Computing servers are increasingly being used to provide various data communications services over a network including, but not limited to, routing of Voice over Internet Protocol (VoIP) calls and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

The use of data communications services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the communications users.

For business entities, the increased use of communications services has been particularly complex, largely due to providing the same level of personal features to users from the vantage point of each business entity's communications platform. As examples, a communications service provider can be providing such communications services to a multitude of business entities, each of which uses the provided services for a customized platform configured to provide communications services to a wide range of employees. For each such customized platform, it can be particularly burdensome for the communications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning systems and methods for customization of emergency notifications for communications services.

Embodiments are directed toward methods for use in communications systems employing a data communications server operated by a communications provider. In such systems, the data communications server includes one or more computer processor circuits (configured with access to databases stored in memory circuits) and configured to act as a communications-control engine for routing, processing communications and/or providing related communications services on behalf of client entities. Such client entities may be exemplified respectively as the above-noted businesses with employees ranging in number from just a few to thousands, and being located/mobile for communications services in any of a multitude of venues. In these embodiments, such methods use the communications-control engine to provide such communications services by receiving communications from communications endpoint devices, and identifying client-specific sets of control data derived from programming instructions written in an instruction-configurable/programmable language that is associated with a message exchange protocol that is used between the communications routing server and data sources. Examples of such programming instructions may include other forms of code providing data and/or instructions over an interface facilitating communication between the communications provider and the communications endpoint devices. Such methods execute the programming instructions to make decisions on how to route communications placed by the communications endpoint devices, and to identify client-specific sets of control data (derived from programming instructions written in a second instruction-configurable/programmable language) associated with the routing decisions. The first and second programmable languages may be similar, in that both languages are derivatives of a same type of programmable language, but the first and second programmable languages may differ in terms of content and use. The first programmable language may identify communications processing directives provided by the communications provider to the client entity, whereas the second programmable language may identify communications routing directives as provided to the communications provider by the client entity. Such methods execute the client-specific sets of control data to retrieve data from the data sources maintained by the communications provider, and provide, in response to the data, communications control functionality for the communications placed by the communications endpoint device.

Certain embodiments are directed toward an apparatus for communications over one or more wide-band networks. The apparatus comprises one or more computer processor circuits configured and arranged to interface with remotely-situated client entities using a first programming language associated with a message exchange protocol between a data communications server and data sources. The one or more computer processors are further configured and arranged to provide a database of communications services to the client entities based on a subscription. Moreover, the apparatus comprises a communications control engine including at least part of the data communications server. The communications control engine can be configured and arranged to, for each respective client entity, identify, in response to receipt of a communications directed toward an end-user of the client entity, client-specific sets of control data derived from programming instructions received over the message exchange protocol and corresponding to a second programming language that is compatible with the first programming language, the client-specific sets of control data including particular communications routing functions for emergency notifications. Moreover, the communications control engine can be configured and arranged to provide the communications services to end-users of the client entity based on the client-specific sets of control data including the particular communications routing functions for emergency notifications.

Certain embodiments are directed toward a communications client server comprising one or more computer processor circuits coupled to memory circuits and configured to interface with a communications provider server providing a database of client-specific communications routing functions and emergency notification features available based on a subscription. The communications client server can be configured to generate a first set of instructions written in a second programming language that is compatible with a first programming language utilized by the communications provider server that defines a message exchange protocol between the communications provider server and data sources. The communications client server can be configured and arranged to transmit to the communications provider server, the programming instructions, the programming instructions associated with communications routing and emergency notification features available to a client entity associated with the communications client server and defining a plurality of emergency numbers and predefined recipients of notification messages responsive to outbound communications to respective emergency numbers. Moreover, the communications client server can be configured and arranged to access a set of communications routing and emergency notification features provided by the communications provider server, the set of communications routing and emergency notification features being defined according and responsive to receipt of event data for routed communications and client-specific sets of control data derived from the programming instructions for the client entity. Further, the communications client server can be configured and arranged to provide emergency notification messages to end-users of the client entity based on the client-specific sets of control data.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
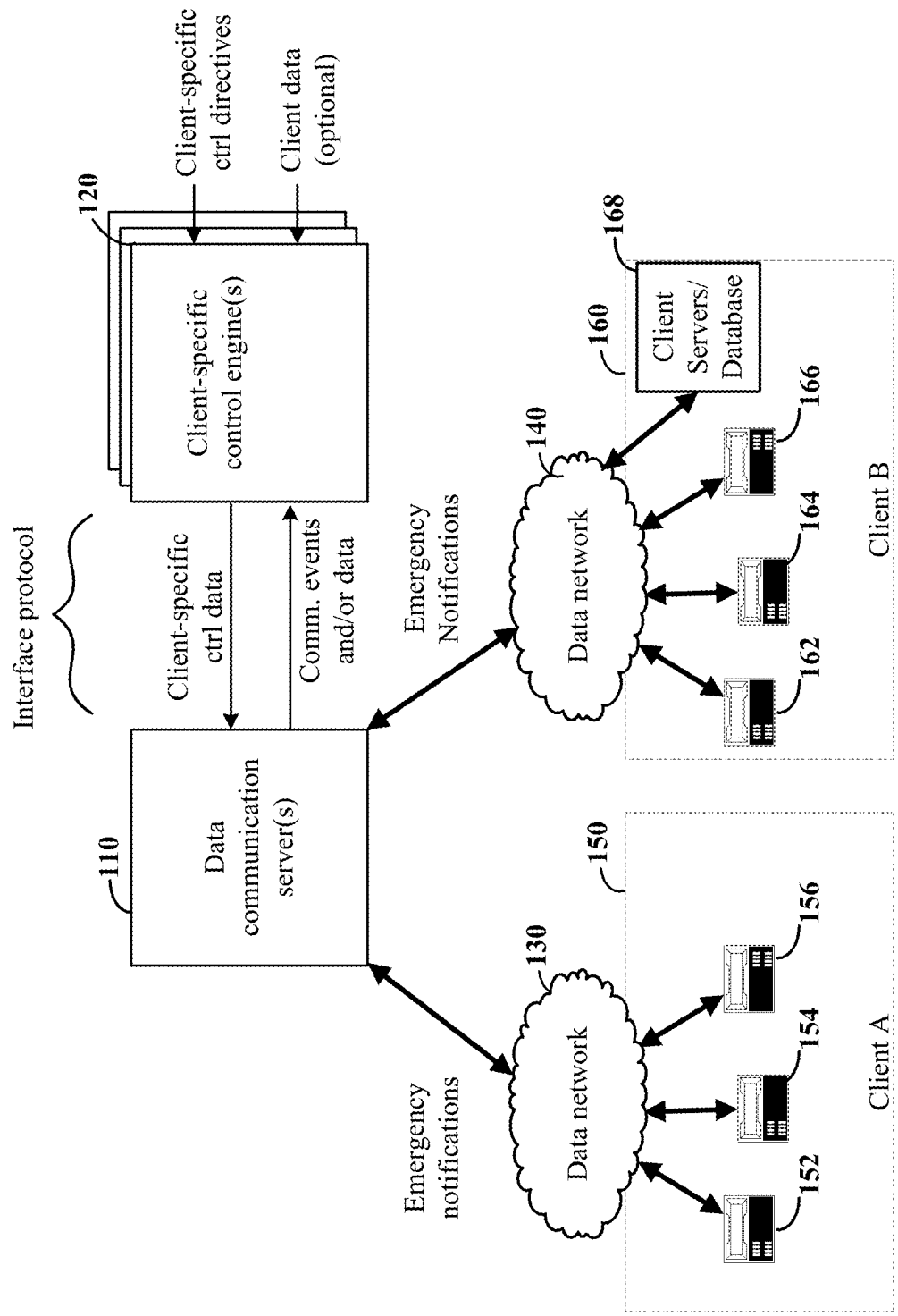
FIG. 1 is a diagram for a communications-enabled system that uses a high-level programming language for communications control functionality and operations, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving customization of emergency notifications for communications services. In certain implementations, aspects of the present disclosure have been shown to be beneficial when used in the context of providing communications services. While the present disclosure is not necessarily limited to such communications systems as described herein, for purposes of facilitating understanding and appreciation of certain embodiments, the following discussion uses Voice over Internet Protocol (VoIP) based services and systems in the context and on behalf of communications platforms of client entities which subscribe to such services from a communications service provider (with a server).

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to communication servers configured to provide communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

Some remote service providers customize their services for different customers. This might include customizable auto attendants, communications routing, communications forwarding, voicemail, or other features. For particularly large clients with many different communications accounts and numbers, implementing and updating these types of customizations can be a significant undertaking. Certain embodiments of the present disclosure are directed toward an interface that allows client-specific control engine to access and dynamically adjust the manner in which remote services are provided for the users of a client account during operation, while maintaining the integrity and security of the underlying system for providing the remote services.

According to certain embodiments, a communications system may be configured to allow a client-specific control engine to dynamically modify and control the communications flow and processing at different levels within the system, including (re)routing of incoming communications generally and by way of private branch exchanges (PBXs) and Internet Protocol PBXs (or IP PBXs) to provide intelligent routing relative to receptionists and direct dial numbers for individuals using the IP PBXs. Rules of various complexity can be used for routing incoming communications, whether to one or more receptionists, directly to extensions, to voicemail, or for other communications routing purposes. The logic used for the routing decisions can be based upon directives and related data shared across multiple PBXs, data that can be dynamically changed, and upon rules and logic that can be defined according to multiple tiers of communications routing decisions. For example, a large company may have many different offices or store locations. Portions of the communications routing and processing can be shared across the entire company. Other portions could be shared with subsets or groups (e.g., groups based upon geographic regions or countries or based upon different company divisions). Still further portions can be set based upon individuals being contacted. Such aspects can facilitate the configuration, management, and updating the communications system, particularly in situations where there are many thousands of extension rules can be a difficult proposition.

According to certain embodiments, the communications system provides inbound and outbound communications routing for one or more PBXs. A PBX is a communications system that switches communications between enterprise users on local lines while allowing all users to share a certain number of external phone lines. External phone lines are telephone lines that are supported by telephone carriers as being individually addressable within the public switched telephone network (PSTN). For example, a PBX can use extensions to direct communications to many phones after a user first makes a communications to a shared number. As another example, a PBX can provide direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to certain example embodiments, a data communications system is configured as a Platform as a Service (PaaS) that provides a user with access to, among other things, communications routing control, PBX functions, computer telephony integration (CTI), and data analytics (in this context the user can refer to, e.g., person, group, server or CPU, or subscribing business entity). Embodiments of the present disclosure are directed toward an interface that allows users of the data communications system solution to access communications capabilities of the underlying system, including its hardware and software components, while maintaining the integrity and security of the underlying system. Particular embodiments are directed toward a communications solution that allows for customization of emergency notifications for customers (client entities) of the data communications system. The emergency notifications may be adjusted for such customers, while also providing the ability to interface with data sources that are either part of the underlying system or external to the communications solution. These features can be used in combination with a communications routing that can be configured and adjusted in a scalable manner.

The ability to access the underlying communications services, including communications routing and communications control engines, can provide a platform that is both flexible and simple to implement from the viewpoints of both the communications service provider and the customers of the communications service provider. The communications solution can be configured to modify and adjust emergency notifications available to customers, and to control the communications flow and processing at all levels within the system, including (re)routing of incoming communications to different PBXs and/or automatically generating and transmitting notifications to particular destinations in the event of an emergency. When compared to an add-on type service where a communication is first handled by a separate PBX, the communications solution may offer a number of advantages and additional features including, but not limited to, increased communications routing capabilities, scalability, and reduced complexity. For instance, access to PBX functions allows for simple communications redirection to extensions or DID numbers provided by the PBX. Moreover, the communications solution coordinates and routes communications between multiple PBXs using an initial communications routing switch. Communications initially routed to a particular PBX can still be rerouted to a different PBX using the initial communications routing switch. Yet further, the communications solution allows a data communications client having multiple end-users to customize the various emergency notifications provided to the end-users, without compromising the security of the underlying system or requiring additional customization by the communications service provider.

The data communications servers providing the underlying function for the data communications system can be configured to utilize a programmable (or configurable) communication protocol such as a high-level, domain-specific programming language as might be implemented with respective data communications servers providing communications routing and IP PBX functions on respective sides of an interface configured to facilitate the communications via the defined protocol. A particular example of a data communications server may use session initiation protocol (SIP) to handle various communications functions (e.g., communications setup and tear down). However, the various embodiments discussed herein are not necessarily limited thereto. Consistent with the above and in other embodiments disclosed herein, the data communications servers can be configured to establish a portion of the communications from the communications endpoint devices to another communications endpoint device or to endpoints on the PSTN through use of a PSTN gateway. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications.

According to more specific example embodiments, a high-level domain-specific programmable communication protocol uses one or more languages which are defined using a markup language as the basis for the language structure. Particular implementations relate to the use of at least two domain-specific languages, one that can be used for initial communications routing and the other for providing more complex and specific communications processing functions. More particular example embodiments use an eXtensible Markup Language (XML). An XML model defines the constraints on the high-level language, including defining the set of valid commands that can be carried out by the data communications servers. Within these constraints, a customer can write XML, code that self-describes the building blocks used in the customer's particular application. XML also allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s). As discussed above, instead of or in combination with such high-level (e.g., XML-type) programming languages, preferably one which is both human-readable and machine-readable, these other implementations may be realized as being suitable for serving communications with different size and/or complexity metrics as needed to provide adequate communications service to customer entities.

Various examples of such XML derivative languages are exemplified in the Appendix as attached to the underlying U.S. Provisional Patent document (Application No. 62/524,164, filed Jun. 23, 2017) incorporated herein by reference. In certain example communications applications, two XML-type languages are implemented as a communications processing XML and a communications routing XML, respectively as XML derivative languages corresponding to XML but customized for processing communications on the side of the interface operating on behalf of customer entities and on the other side of the interface for higher level processing (including, for example, communications routing) by the communications service provider. Such XML derivative languages can be written specific to types of functionality as needed for various customer entities, thereby allowing developers to program communications processing logic or service execution logic with both XML building blocks and JavaScript/TCL, or other scripting languages best suited to levels (e.g., in terms of quantity range) of a customer's endpoint devices and/or in terms of complexity of the communications-based media functionality and evolving demands expected by a customer. In certain implementations, XML derivative languages allow customer developers to program and integrate communications flow (e.g., as provided by a cloud-based communications service) with customer or third party application servers and databases. In particular, the communications flow can include a connection that is used as part of communications routing decisions and communications processing options that are related to one or more receptionists that can answer communications to a group of communications endpoint devices. The system allows different levels of communications control logic to be implemented in a manner that can facilitate scalability of the system of large organizations with many communications endpoint devices and/or end-users and with complex organizational structures that have corresponding complex communications routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related communications data can be provided in documents corresponding to other languages and/or communications protocols; for example, one such programming language can be used for initial communications routing and another programming language can be used for providing more complex and specific communications processing functions. As discussed above, instead of or in combination with such XML-type languages, these other implementations may be realized as being suitable for serving communications with different size and/or complexity metrics as needed to provide adequate communications service to customer entities.

According to particular embodiments, an XML engine can respond to a communications, or other event, by sending requests to a web server and get XML derivative documents for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, communications control, and flow control logic. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the communications server provider's cloud database). This information can then be used to drive communications flow or communications control functionality and decisions.

As applicable to routing decisions relating to receptionists, an incoming communications can be processed according to client-specific sets of control data with instructions for providing emergency notifications under predefined circumstances. As an example, the client-specific sets of control data can include a set of global rules for determining when and how to transmit an emergency notification. A school district may specify that when a communication is placed from one of the schools in the school district to an emergency dispatch number (such as 911 in the United States, 112 in the United Kingdom, etc.), then a notification may be communicated to a particular recipient. The communications may then be routed to the appropriate emergency dispatch number. The client-specific sets of control data can also specify how such emergency notifications are provided, and who they are provided to. For instance, the client-specific sets of control data may instruct a communications control engine to send an Short Message Service (SMS) text message to an administrator of the client entity, as well as an email message to a predefined distribution list associated with the client entity (in the above example, the school district). The client-specific sets of control data can specify local rules for routing communications and/or providing emergency notifications (e.g., to communications endpoint devices, voicemail, auto communications attendants), or otherwise processing the communications. The local rules might be used if global rules specify that the communications is not routed to a receptionist, or if the receptionist rejects or forwards the communications on. Each of the local and global rules can be driven, at least in part, by data retrieved from a data source, such as a client server or database. As an example, the global rules could access a customer database that includes lists of user IDs that are handled differently. The data communications server does not need to have direct access to the lists of user IDs (which might be confidential lists and thereby represent a security risk if shared directly with the data communications server). Rather, the data communications server can send a query that includes a specific user ID number of an incoming communications. In response to the query, information can be provided that indicates how to process the communications (e.g., whether to route the incoming communications to a receptionist or directly to the dialed communications endpoint device).

According to various embodiments, the high-level programming language allows a programmer access to the communications solution by way of a controlled and limited set of communications control functionality in the form of communications processing and routing operations. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control of, or access to, the inner workings of the data communications servers. In a similar manner, in various embodiments, the communications service customer can update or make changes to the various communications services that are provided to end-users to provide a customizable solution for each communications service customer and their respective end-users.

In various embodiments, the high-level programming language and the data communications servers that execute the high-level programming language can be configured to interface with other sources of data and control. This can include, for example, flow control decisions that are based upon code running on the client side or on the server side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

In example embodiments, an apparatus may be configured to provide customized virtual office features (e.g., communications services) to clients of the communications service provider. The apparatus may include a data communications server that is configured and arranged to provide a database with a set of virtual office features including client-specific communications routing functions. The set of virtual office features, including communications routing functions, may be available to remotely-situated client entities based on a subscription provided by the communications service provider. Similarly, the data communications server may provide emergency notifications to end-users of the client entities according to client-specific control data. The client-specific sets of control data may be derived from programming instructions provided by the client entity. For example, a client entity such as a fitness company may subscribe to a particular set of communications services hosted by the data communications server. The client entity may have a number of franchises located in different geographic regions, and each franchise location may have different needs for communications services. Moreover, the franchises may be located in different countries that use different calling numbers for emergency dialing, and/or have different processes that are implemented in the event that an emergency occurs at the franchise. As such, the client entity may wish to provide different types and/or different configurations of communications services for its different franchise locations. In such a manner, the data communications server may provide client-specific sets of control data to the communications service provider, specifying when and how emergency notifications are sent. Such emergency notifications may include email notifications sent to a predetermined recipient or list of recipients, an SMS or text message sent to a predetermined recipient or list of recipients. In another non-limiting example, the client entity may utilize a number of PBXs or IPBXs, and may segment the various end-users among the different PBXs, such that incoming communications are routed to one of the many PBXs associated with the client entity.

The apparatus may also include a processing circuit (e.g., a client-specific control engine) configured and arranged to provide the client-specific sets of control data to the data communications server. The processing circuit may retrieve event data for communications routed by the data communications server. Similarly, the processing circuit may receive from a remotely operated server on behalf of the client entity (e.g., a client server), programming instructions written in a programming language that defines a message exchange protocol between the communications provider server and data sources. For instance, the programming instructions, stored in the form of client-specific sets of control data, may specify communications handling procedures to be implemented for end-users of the client entity, or a manner in which the communications services may integrate with other network applications used by the client entity (e.g., client-specific network applications), among other examples. The client-specific sets of control data may specify how and when emergency notifications are sent to intended recipients, such as an administrator associated with the client entity, among others. Data from the client-specific network applications may be imported to the virtual office features. For instance, contacts from a client-specific email application may be imported to the virtual office features, allowing those same contacts to be accessed using the Data communications system, and such contacts may be accessed for sending emergency notifications as specified by the client entity.

In response to receipt of the programming instructions from the client server, the processing circuit may generate client-specific control data based on the event data and the received programming instructions. From the client-specific control data, the data communications server may provide the virtual office features, including emergency notification, as specified by the client entity.

The client specific control data may define various aspects of the virtual office features provided to end-users of the client entity. For instance, client specific control data may instruct the communications control engine to generate and route notification messages to at least one predetermined location responsive to emergency numbers being dialed by end-users of the client entity. Such communications control directives may further instruct the communications control engine to generate an email message to a predefined email address in response to an emergency number being dialed by an end-user of the client entity at a particular location. Additionally and/or alternatively, the client-specific sets of control data further instruct the communications control engine to generate a text message to a contact (e.g., telephone number) specified in the set of directives responsive to an emergency number being dialed by an end-user of the client entity at a particular location. In some examples, the client-specific sets of control data further instruct the communications control engine to identify a plurality of different emergency numbers that are indicative of different physical locations. Similarly, the client-specific sets of control data instruct the communications control engine to identify the outbound communications is being made to an emergency number.

In some examples, the client-specific sets of control data may define at least one communications center to receive communications placed to the end-users, where the communications center routes the received communications according to the client-specific sets of control data. The communications center may provide a greeting upon receipt of incoming communications, and provide customized communications routing options for the end-users of the client entity. For instance, after playing a prerecorded greeting, the communications center may provide communications routing options based on the directives provided by the client entity, such as extensions for particular business units, a company directory, and/or an option to dial a particular extension.

The client-specific sets of control data may also define system integration processes. Each client entity may utilize a number of network applications to support daily operations. For instance, the client entity may utilize an email application, an appointment scheduling application, and/or a messaging application, among other examples. The client-specific sets of control data may be configured to define a manner in which emergency notifications may be sent to end-users via the different network applications. For example, the virtual office features provided by the data communications server may collaborate with the client's email application, allowing for an emergency notification to be sent to specified end-users from their email application using the virtual office features.

In various embodiments, a communications client server may be provided, comprising one or more computer processor circuits coupled to memory circuits and configured to interface with the communications provider server. As described herein, the communications provider server can be configured to provide a database of virtual office features available based on a subscription, and the communications client server can be configured to generate a first set of instructions written in a particular programming language that further define and/or adjust the manner in which emergency notifications are provided to a client entity and/or end-users of the client entity. As described herein, the programming language defines a message exchange protocol between the communications provider server and data sources. The communications client server can transmit to the communications provider server, programming instructions written in the programming language and associated with emergency notification services provided to a client entity associated with the communications client server.

In some instances, the client entity can allow the communications service provider to indirectly access data sources of the client entity. For example, the client entity can specify, in a second set of instructions in the programming language a URI that points to the communications client server and specifies an associated query. The communications client server can execute, for example, a local script that may rely upon customer data. The script can generate a response in the particular programming language, and the communications provider server can then carry out communications routing, or other communications control functions, based upon the response and without ever having direct access to the customer data. As such, the communications client server can be configured to provide a second set of instructions in the programming language, to retrieve data from the data sources based on the accessed set of adjusted virtual office features. The communications client server may provide, in response to the retrieved data, communications control functionality to end-users of the client entity based on the accessed set of adjusted virtual office features.

Consistent with various embodiments of the present disclosure, instructions (e.g., directives) provided by the communications client server to the communications provider server may define various aspects of the virtual office features provided to client entities and/or end-users of client entities. For instance, a client entity may wish to provide different virtual office features to different subgroups of end-users, and/or to configure different virtual office features differently for different subgroups of end-users. The client entity may wish to send an emergency notification to a specific individual under a first set of circumstances (such as a communication is placed to a third party security services firm), and a different emergency notification to a different individual or set of individuals under a second set of circumstances (such as a communications is placed to the fire department indicating a fire or flood at a particular location). Such subgroups may differentiate administrators that have access to additional virtual office features from non-administrators that should not have access to such additional features. Similarly, such subgroups may differentiate different business units of end-users that have different needs for virtual office features compared to other business units. As such, the directives for the client entity may define a plurality of end-user subgroups of the client entity, and the communications client server may be configured to provide access to the set of adjusted virtual office features according to permissions of the end-user subgroups. Similarly, the directives for the client entity may define a plurality of emergency notification subscriptions to be included in the virtual office features provided to the client entity, and the communications client server may be configured to access the plurality of data subscriptions using the communications provider server.

Consistent with embodiments of the present disclosure, a method for use in a data communications system may be provided. The method may include receiving from a data communications server, event data for routed communications. As described herein, the data communications server may be configured and arranged to provide a database with a set of virtual office features available to remotely-situated client entities based on a subscription. Also, as described herein, the client entity may provide (via the communications service provider) the set of virtual office features or communications routing capabilities to a plurality of end-users. The method may include generating at a client server communicatively coupled to the data communications server, programming instructions, in response to receipt of the event data and in a programming language that language that is compatible with a first programming language utilized by the communications service provider. The event data may be received via an interface associated with the data communications server, and the client server may be configured and arranged to provide programming instructions for a respective client entity in a programming language that defines a message exchange protocol between the data communications server and data sources. Moreover, the data communications server may adjust the virtual office features available to end-users of the particular client entity according to and responsive to the client-specific sets of control data and the event data. The data communications server may subsequently provide the virtual office features to the end-users of the particular client entity via the interface. To provide a simplified, yet customizable solution that protects the security of the underlying data communications system and client entity data, the virtual office features may be provided to the end-users of the particular client entity in a programming language that includes communications flow commands for communications routing logic (such as an XML language, XML-derivative language, or other language described herein). The directives for the respective client entity may be provided to the data communications server in a programming language that is a subset of a programming language used by the data communications server that defines a message exchange protocol between the data communications server and data sources. Moreover, the virtual office features may be dynamically adjusted to account for changing needs of the client entity. As such, the set of adjusted virtual office features may be revised via the data communications server, responsive and according to additional directives received from the particular client entity. For instance, the set of adjusted virtual office features may be revised via the data communications server responsive and according to customized alert directives received from the particular client entity, where the customized alert directives define a manner in which notifications, alerts, and/or specified types of messages are provided to end-users of the client entity. Moreover, a client entity may provide desktop sharing, and thereby allow remote access and remote collaboration on a person's computer desktop through a graphical terminal emulator. As the client entity grows (or constricts, as the case may be), the client entity may adjust policies that govern desktop sharing provided by the data communications server by providing shared desktop directives to the data communications server. The shared desktop directives may define virtual network configurations for end-users of the shared desktop, or other aspects of desktop sharing.

Turning now to the figures, FIG. 1 shows a block diagram of a system for providing communications for endpoints of a plurality of client accounts, consistent with embodiments of the present disclosure. The system includes a computing server 110 configured to provide communications for a plurality of communications endpoint devices 152, 154, 156, 162, 164, and 166 connected in one or more data networks 130 and 140. The communications endpoint devices may include communications-enabled devices (e.g., IP phones, smart phones, tablets, and/or desktop computers with appropriate communications software applications) and/or non-communications endpoint devices. Each communications endpoint device is respectively associated with an account of a respective client. Communications endpoint devices may be associated with a particular client account by registering the communications endpoint device with a particular client account serviced by the data communications server. Registered devices for each client account may be listed in a respective account settings file (not shown) stored by the data communications servers 110. In this example, communications endpoint devices 152, 154, and 156 are associated with in an account 150 for a first client A and communications endpoint devices 162, 164, and 166 are associated with in an account 160 for a second client B.

The system includes one or more processing circuits configured to implement client-specific control engines 120, which are configured to adjust the communications provided for each client account according to a respective set of control directives. For instance, the client-specific control engines 120 may adjust routing of communications for a client account by generating client-specific sets of control data to the data communications server 110. For example, the client-specific control engines 120 may generate client-specific sets of control data by processing the respective programming instructions for the account in response to communications event data or other data prompts received from the data communications server(s) 110. For instance, the programming instructions for a client account may be configured to adjust emergency notification processes of a particular client entity in response to a revision in the programming instructions received from the client entity.

Different embodiments may process the control directives differently to make control decisions for the client. For instance, in some embodiments, the control directives may be executed on a processor. Additionally or alternatively, control directives may be specified using a high-level programing language that is compiled and executed in a virtual language environment (e.g., Java). Additionally or alternatively, control directives may be specified in a look up table that is accessed in response to communications events. Additionally or alternatively, the directives may describe circuits (e.g., in a hardware descriptive language) that are hardware accelerated by implemented the circuit in a field programmable gate array.

The control directives for a client account may generate the client-specific sets of control data based on various data metrics including, for example, communications events or data received from the data communications server, user input (e.g., input via dial-tones and/or GUI), data acquired from a client (e.g., from a client database), and/or data provided by third parties (e.g., third party monitoring services). The client-specific control engines 120 communicate the client-specific control data to the data communications server(s) using an interface protocol having an instruction format that is independent of an instruction format used to implement the client-specific control engines 120 and/or client-specific control directives. The independent instruction format of the interface protocol allows clients to write control directives including complex logic and various data sources, for example, using various different high-level languages without regard to the particular language used to implement or communicate with the communications computing server. For example, a set of control directives for a first client may be defined using a first instruction language that is different than a second instruction language used by a client-specific control engine to communicate with the data communications server. A set of control directives for a second client may be defined using a third instruction language that is different than the first and second instruction languages. In some embodiments, the instruction set of the interface protocol may be configured to limit customer control over certain communications settings—thereby preventing clients from disrupting operations of the computing service with faulty client-specified directive code.

Different embodiments may implement the client-specific control engines 120 in various locations. For example, client-specific control engines 120 for one or more client accounts may be implemented in a central server connected to, or incorporated with, the data communications server(s) 110. Additionally or alternatively, one or more client-specific control engines 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of virtual office features including, for example, communications services such as VoIP communications, audio and/or video conferencing, IPBX exchange servers, packet switching, and traffic management as well as non-VoIP services including, but not limited to, website hosting, remote data storage, remote computing services, virtual computing environments. One or more of such virtual office features may be provided, for example, by a cloud computing network having one or more servers configurable to provide a data communications system for a plurality of clients.

Figure 2:
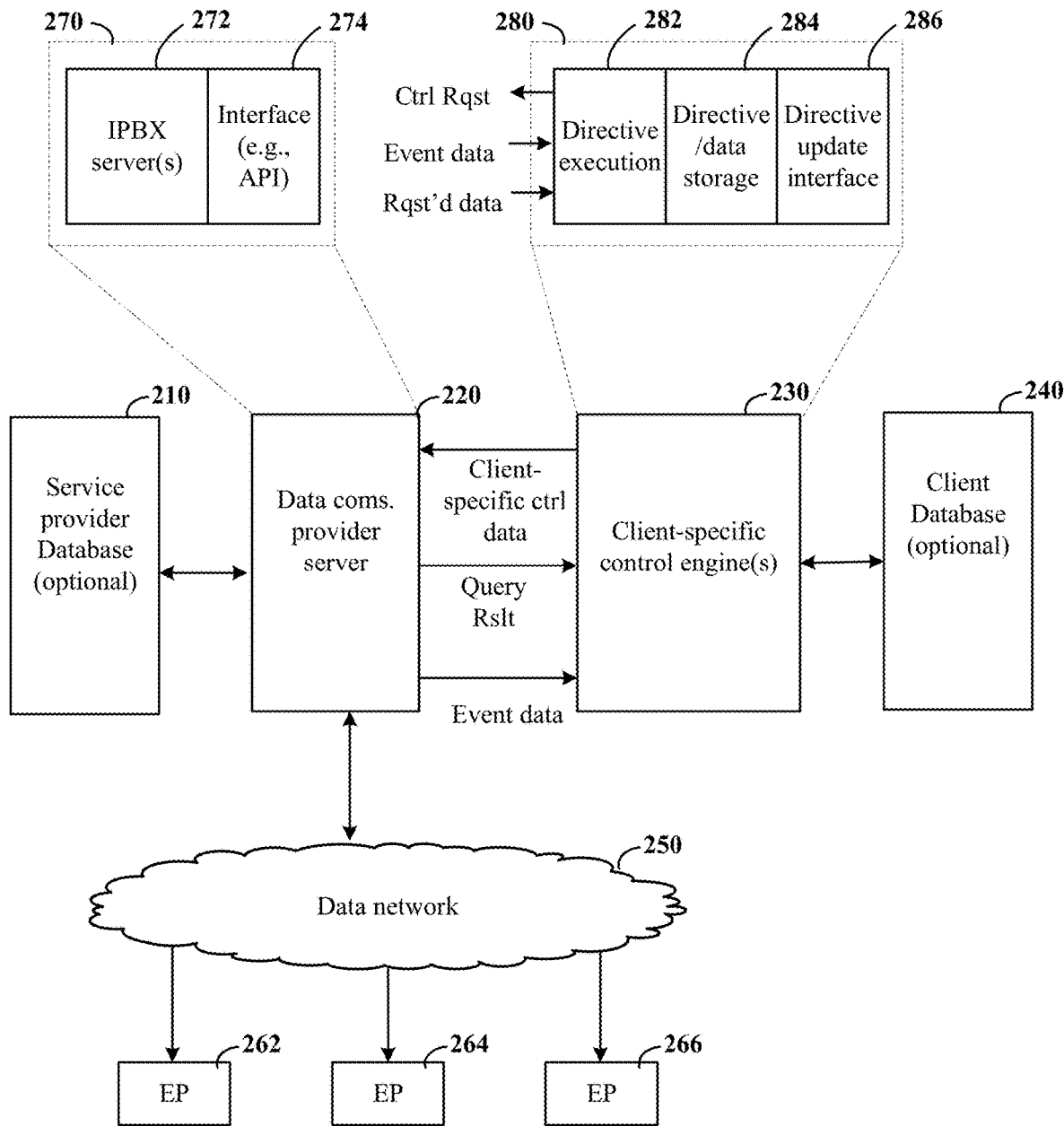
FIG. 2 is a block diagram of a communications control engine with high-level programmable language logic for two different languages, consistent with embodiments of the present disclosure.

FIG. 2 shows a block diagram of an example system for providing virtual office features for endpoints of a plurality of client accounts, consistent with embodiments of the present disclosure. The system includes a communications provider server 220 configurable to provide one or more virtual office features for a plurality of communications endpoint devices 262, 264, and 266 connected in a data network 250. Each communications endpoint device is respectively associated with an account of a respective client.

The system includes a processing circuit(s) configured to implement client-specific control engines 230. The client-specific control engines 230 are configured, as described with reference to client-specific control engines 120, to adjust emergency notifications (e.g., communications) provided for each client account according to a respective client-specific sets of control data. For instance, the client-specific control engines 230 may dynamically adjust a manner in which emergency notifications are sent to a client by communications provider server 220.

As described with reference to FIG. 1, the control directives (e.g., programming instructions) for a client account may generate the client-specific sets of control data based on various data metrics including for example, communications events or data received from the data communications server, data acquired from a client (e.g., from a client database), and/or data provided by third parties (e.g., third party monitoring services). In some embodiments, the control directives may cause the client-specific control engine 230 to query data from a client database 240 or from a service provider database 210. In some embodiments, the control directives may cause the client-specific control engines 230 to issue an analytics request specifying a particular evaluation of data in a database (e.g., 210 or 240). For example, client-specific control data communicated to the communications provider server 220 may prompt the communications provider server 220 to perform a particular analytical evaluation of data stored in the service provider database 210. After completing the requested evaluation, the communications provider server 220 communicates the result back to the requesting client-specific control engines 230. Data retrieved from the databases and/or via analytics evaluation may be used, for example, to dynamically adjust the virtual office features provided during operation.

The client-specific control engines 230 communicate the client-specific control data to the data communications server(s) using an interface protocol having an instruction format that is independent of an instruction format used to implement the client-specific control engines 230 and/or client-specific control directives.

As previously described, the independent instruction format of the interface protocol allows clients to write control directives, for example, using their preferred high-level programming and/or may be used to limit customer access and/or control over the communications provider server. For example, the interface protocol may be configured to allow the client-specific control engines to request analytical analysis of data in the service provider database 210 without allowing direct access to the raw data stored therein. Similarly, the client-specific control engines may be configured to request analytical analysis of data in the client database 240, without allowing direct access to the raw data stored therein.

As described with reference to FIG. 1, client-specific control engines 230 may be implemented in various locations. For example, client-specific control engines 230 for a particular client account may be implemented in the communications provider server(s) 220, in a separate processing circuit communicatively connected to the communications provider server(s) 220, using one or more processing circuits of the client, or a combination thereof.

The communications provider server(s) 220 and client-specific control engines 230 may be implemented using various circuit arrangements. Block 270 shows an example implementation of a communications provider server configured to provide a communications services for a client. The example communications provider server 270 includes one or more IPBX server(s) 272 configured to establish and direct communications for a plurality of endpoint of a customer account. Interface circuit 274 is configured to allow different client specific control engines to communicate with the communications provider server 220 via a common high-level language instruction set (e.g., a set of XML, instructions).

Block 280 shows an example implementation of a client-specific control engine 230. In this example, the client-specific control engine includes a storage circuit 284 configured to store control directives and/or data for one or more client accounts. Directive execution circuit 282 is configured to provide client-specific control of the remote services provided for a client via execution of the control directives for the client stored in storage circuit 284. In some implementations, the directive execution circuit 282 is configured to communicate client-specific control data to the communications provider server 220, for example, via interface 272, using a high-level language instruction set (e.g., a set of extensible meta-data language (XML) instructions). Additionally or alternatively, the directive execution circuit 282 may retrieve one or more sets of directives from an external source (e.g., a client database). In this example, the client-specific control engine shown in block 280 includes a directive update interface circuit 286 configured to facilitate upload and/or editing of control directives for a client account.

Figure 3:
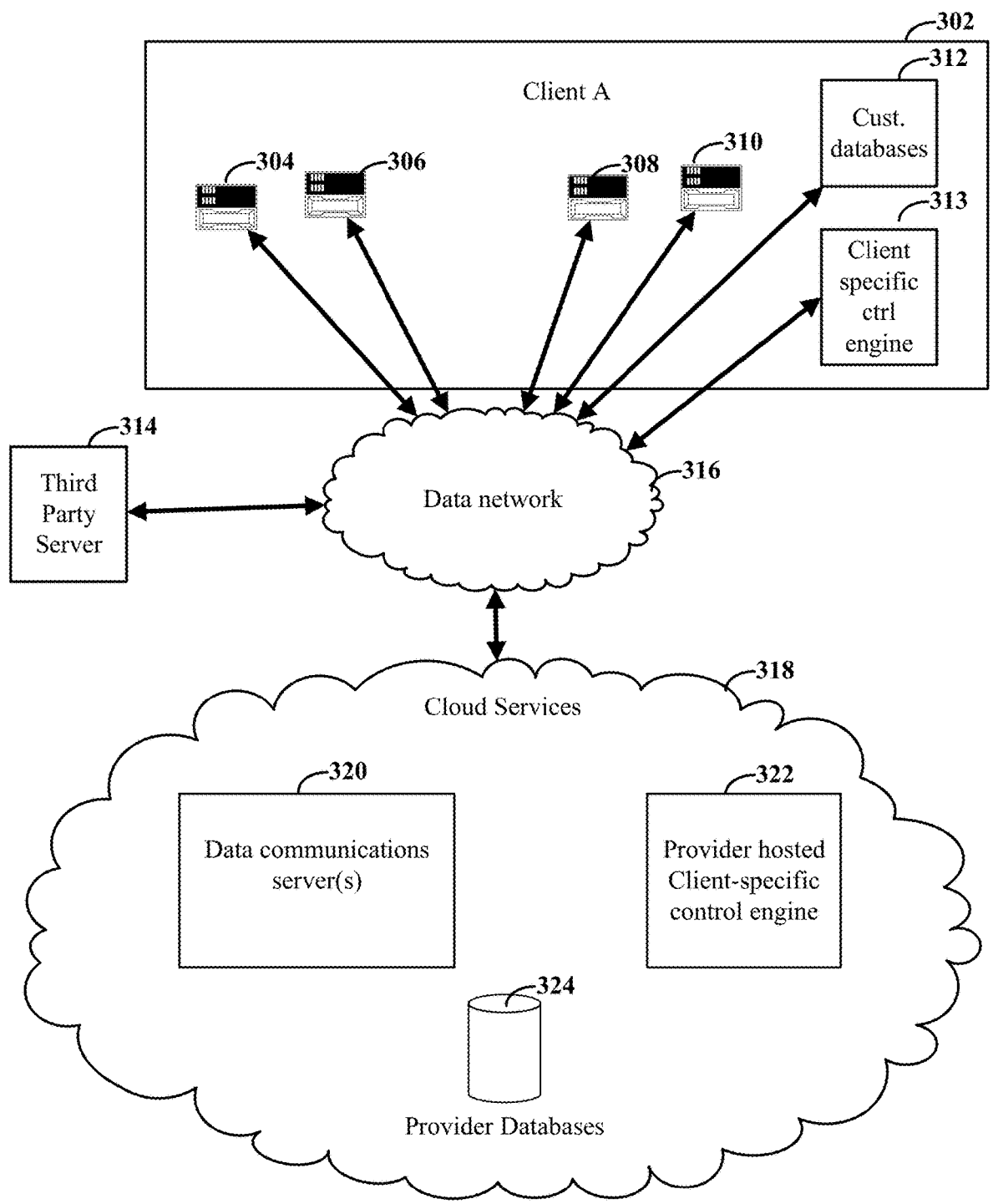
FIG. 3 is a block diagram showing the use of a hierarchy of programmable language documents, consistent with embodiments of the present disclosure.

FIG. 3 is a diagram for a system that uses a high-level programming language for communications control operations, consistent with embodiments of the present disclosure. In connection with these specifically-illustrated examples, communications endpoint devices 304, 306, 308, and 310 connected in a data network 316 are configured to place and receive communications between other communications endpoint devices, and/or between non-communication endpoint devices. The various communications endpoint devices include circuitry that is specially configured to provide communications functions that include interfacing with the appropriate circuitry of the communications service provider used by the corresponding communications endpoint device. In many contexts, a communications endpoint device is a communications-enabled telephone commonly referred to as IP phones. The communications endpoint devices can include, but are not limited to, desktop computers, mobile (smart) phones, laptop computers, and tablets. When each of the communications endpoint devices originates or receives a communications in a telephone network, each can be characterized or referred to as an addressable communications endpoint.

The communications routing and other services for the communications can be provided by one or more data communications servers 320 within a cloud services system 318 (e.g., configured to provide virtual office features to customers of the communications service provider). In particular example embodiments, the data communications servers 320 can be located within the cloud services system 318. The cloud services system 318 also includes one or more provider hosted client-specific control engines 322, configured as described with reference to 230 in FIGS. 2 and 120 in FIG. 1. A client-specific control engine 313 may also be implemented locally by a client (e.g., 302). In some embodiments, data centers can be part of a cloud services system 318 where the hardware providing the cloud services is located in a number of different data centers with different physical locations. Consistent with embodiments, the cloud services can include SIP servers, media servers, and servers providing other services to both communications endpoint devices and the users of the communications endpoint devices. In some instances, the various servers, including both the data communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data communications server uses session initiation protocol (SIP) to handle various communications functions (e.g., communications setup and tear down); however, the various embodiments discussed herein are not necessarily limited thereto. Consistent with the above and other embodiments disclosed herein, the data communications servers can be configured to establish a leg of the communications from the communications endpoint devices to another communications endpoint device, or to a gateway.

According to various embodiments, one or more data analytics servers can monitor and analyze communications data relating to the data communications servers and communications endpoint devices. For example, a data analytics server can be designed to track communications statistics about various different communications-related parameters, such as communications duration, communications date, communications time of day, contacted parties, communications endpoint devices, selected data centers, selected carriers, dropped communications, transferred communications, voicemail access, conferencing features, and others. The high-level programming language(s) and the data communications servers executing the languages can access the communications summary metrics and the data analytics, which can be stored in a provider database 324. For example, a script running the data communications server could parse communications processing XML (CPXML) documents to generate database queries that direct the data communications server to query, or subscribe to, communications length summaries for all communications made to endpoints that are registered to the data communications server. The script could then use the information to control how communications are routed as well as how different (customer or provider) services are invoked. According to various embodiments, the database queries could be sent to a customer database 312.

Consistent with certain embodiments, the data communications server can be configured to interface with customer databases 312, or with a third party server 314. For instance, a CPXML document stored by the cloud-based system 318 can identify, based upon a received communications, a Uniform Resource Identifier (URI) that points to customer databases 312, or to a third party server 314. Control directives provided from these servers, for example, in the form of a CPXML document can be used to specify communications routing, or other functions.

Figure 4:
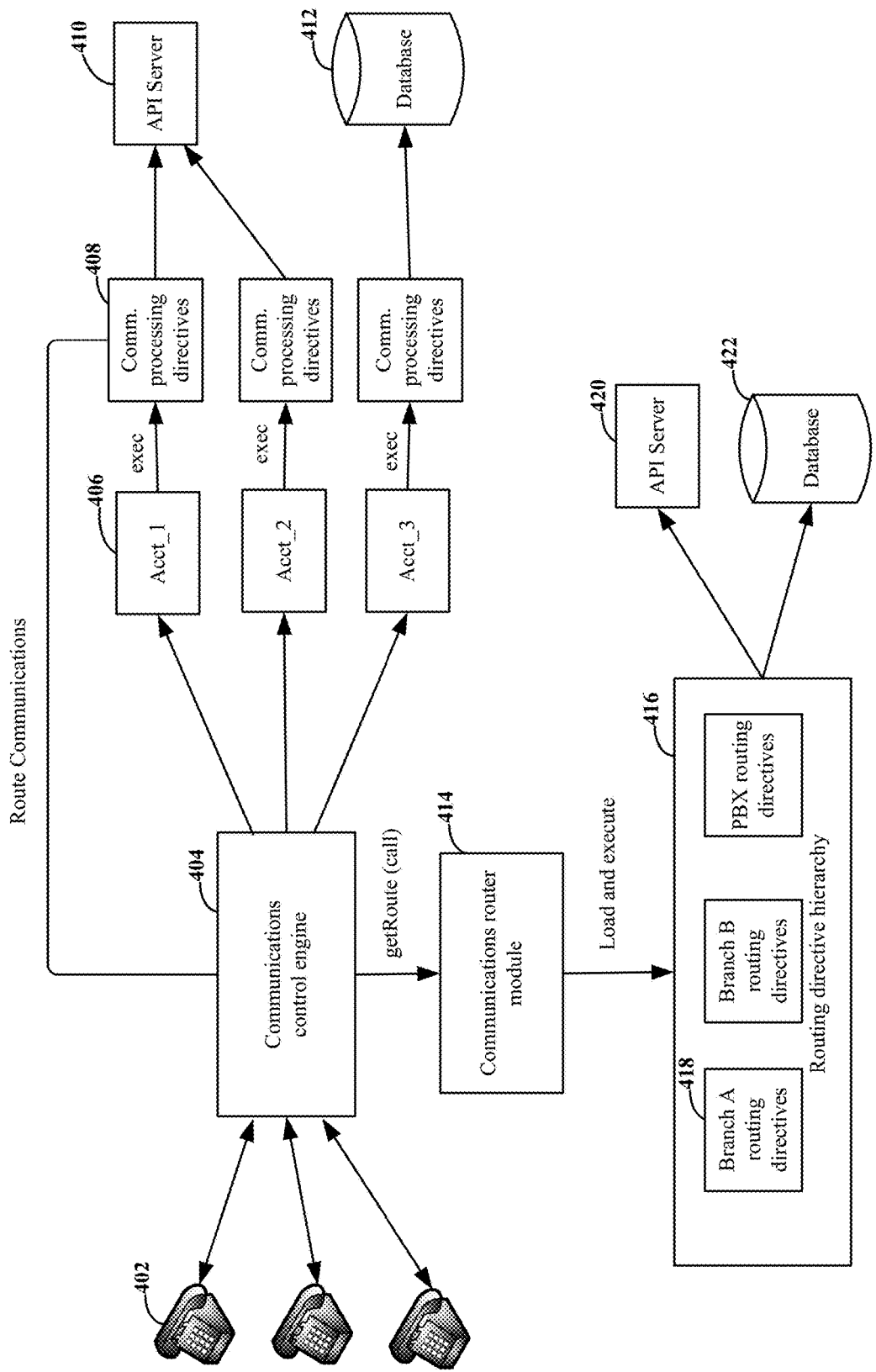
FIG. 4 is a block diagram showing the use of a hierarchy of programmable language documents, consistent with embodiments of the present disclosure.

FIG. 4 is a block diagram showing the use of a hierarchy of programmable language documents, consistent with embodiments of the present disclosure. Communications control engine 404 can provide communications flow control and routing in a manner that can be consistent with discussions found herein and relating to communications control engines, data communications servers, and the other figures. Consistent with various embodiments, the communications control engine 404 is a PBX that is part of a data communications system. For instance, the PBX can be configured using Java-based applications that manage voice over IP (VoIP) networks. The PBX can be hosted by a communications service provider and located at one or more data centers. Various PBX features can be provided, such as communications forwarding, remote pickup, communications routing, and voice mail.

Consistent with various embodiments, customers of a communications service provider can use the data communications system by generating documents written in both CRXML and CPXML. Together, the documents specify how the customer would like communications intercept to be handled for both inbound and outbound communications. For instance, a CPXML document 408 can be associated with an extension account 406, or with groups of extension accounts. The extension accounts 406 can represent a specific individual and their associated extension number(s). A CPXML document 408 that is configured in this manner will be invoked by the communications control engine 404 after an incoming communications is routed to an extension that has CPXML capabilities enabled. CPXML documents can also be used for communications flow processing of outbound communications. The CPXML document may provide logic for sophisticated communications flow communications control functions for outbound communications. For example, messages (e.g. text messages and email messages) can be automatically generated in response to outgoing communications and restrictions can be placed on outbound communications based upon factors such as time of day or communications history. Another CPXML function could be implementation of auto attendants that are each specific to the CRXML-specified routing decision.

The communications control engine 404 may also consult with communications routers 414. The communications routers can be programmed using CRXML documents 418, and with JavaScript for dynamic data access and logic handling. The CRXML documents 418 can be arranged in router xml hierarchy 416, which can specify different CRXML documents 418 depending upon the branch or PBX that is identified as corresponding to the communications. Once the communications router documents are loaded, they can be cached in memory and used by the communications control engine 404 to make a routing decision. When a communications is routed through the communications control engine 404, the communications control engine can consult with high-level CRXML documents. The branch level can be identified, for example, based on the branch Id of caller (for outbound calls) or callee (for inbound calls). Delineations other than the branch are also possible, such as by the called country, the particular store, the state, or other. If a route result is not determined, the communications control engine 404 can also consult with PBX-level CRXML document to obtain routing decisions. Examples of a route result from a script are "Accept," "Reject," or "NewRoute." Thus, the programmable communications router (CRXML) module 414 provides the communications control engine 404 with the ability to handle communications intercept/filter reject or re-route the communications to a different target destination.

The communications router module 414 can also interact with a CPXML document to handle sophisticated communications flow scenarios where the communications routing is changed after the initial determination. For example, the CPXML can include commands (e.g., "reroute") that the communications control engine 404 uses to provide feedback to the programmable communications routers 414, which use CRXML for initial routing decisions. This might allow, as an example, a CRXML routing decision to be overridden by the CPXML document(s).

According to particular embodiments, the programmable communications routers (using CRXML) 414 can be viewed as plugins to the communications control engine 404. The communications router plugins may have two levels—Branch and PBX levels. The communications router supports CRXML-defined structures that specify how the PaaS can be utilized by a customer. For example, the CRMXL can define sets of conditional statements, data access requests, and communications routing commands: if/else, condition, goto, log, var, script, query, data, accept, reject, route statements, or other similar commands. In particular embodiments, CRMXL can be considered a subset of CPXML by containing a part, but not all, of the CPXML communications flow commands. This distinction can be useful for keeping CRMXL documents light weight so that communications routing decisions are simplified and efficient. More complex tasks, such as the use of media and advanced communications handling, can be handled using CPXML. Using such programmable communications routes, a few example uses include: school district that generates SMS/Email notifications to parents whenever an emergency number is dialed; off hour restriction of outbound communications with CPXML; communications center lockdown to provide outbound dialing restriction for phones; computer initiated dialing with user identification (ID) override based destination database table, and communications return to target DID/agents; and implementation of a communications black list (denying communications to/from the list) or white list (allowing communications to/from the list) with potentially large lists and dynamic updating capabilities.

Consistent with embodiments of the present disclosure, both CRXML and CPXML provide the capability of handling dynamic data from multiple sources. Examples of these sources are depicted as application program interface servers 410, 420 and databases 412, 422. The dynamic data can therefore be provided from a variety of sources including, but not necessarily limited to, communications route session data (user id, caller/callee id, or route from/to), query custom object (to a database) in the communications service provider system/cloud, and access data through HTTP RESTful API. For instance, the XML documents can include a web resource that is identified by Uniform Resource Identifiers. The web resource might be a customer HTTP server that responds to a conditional query (e.g., whether or not a communications queue is above a threshold) with CPXML code that instructs the communications control engine on how to route, or otherwise handle, the communications. In such a manner, client-specific sets of control data provided by the communications control engine may allow for adjusted (e.g., customized) virtual office features for end-users (such as 402) of the data communications system.

Figure 5:
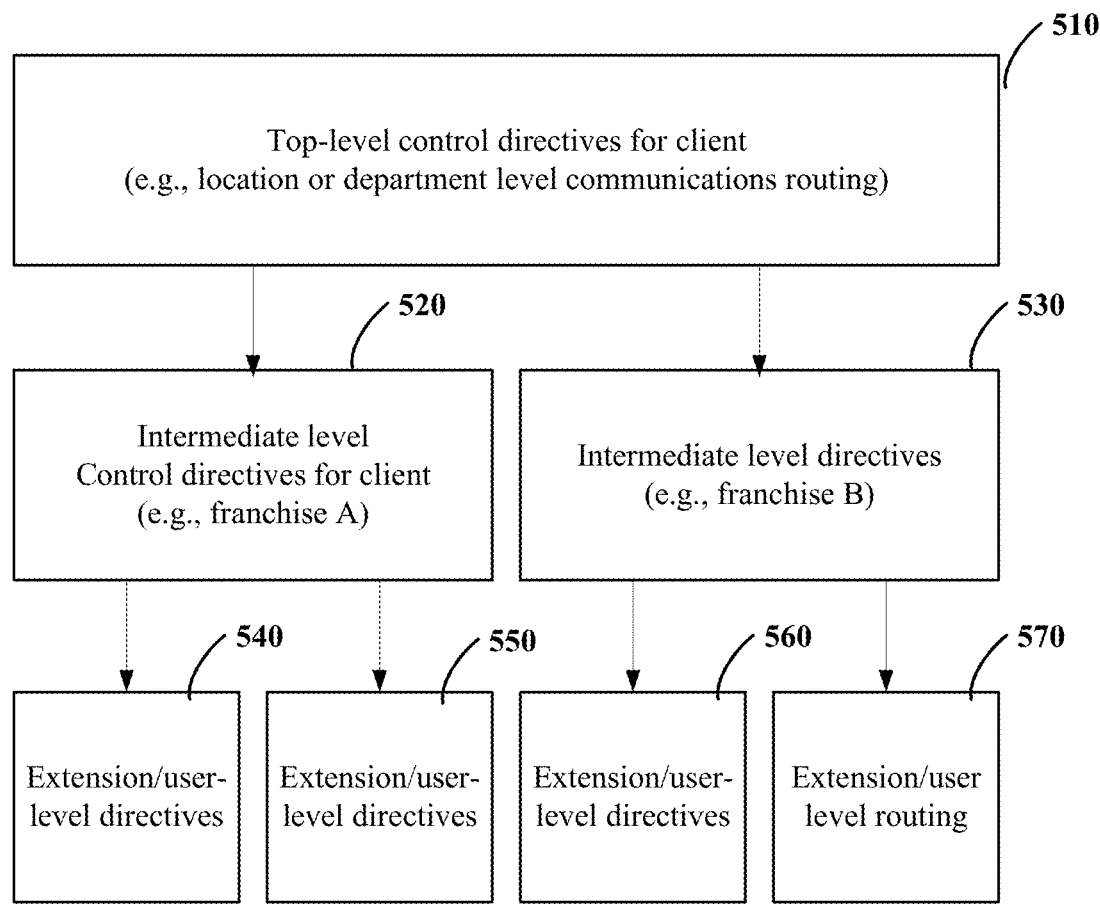
FIG. 5 is a block diagram showing an example set of control directives configured for multiple levels of control, consistent with embodiments of the present disclosure.

FIG. 5 is a block diagram showing an example set of control directives configured for multiple levels of control, consistent with embodiments of the present disclosure. In this example, block 510 provides a set of top-level control directives that are applicable to all communications for a client. Blocks 520 and 530 show a set of intermediate-level control directives that are applicable only to a subset of endpoints included in the client account (e.g., for respective IPBXs, branches, department, and/or franchisees). Blocks 540, 550, 560, 570 are shown as lower-level control directives that are applicable to particular extensions and/or end-users of the client account. The lower-level control directives may be useful, for example, for an end-user to customize and/or dynamically adjust direction of communications to an extension throughout the day.

Figure 6:
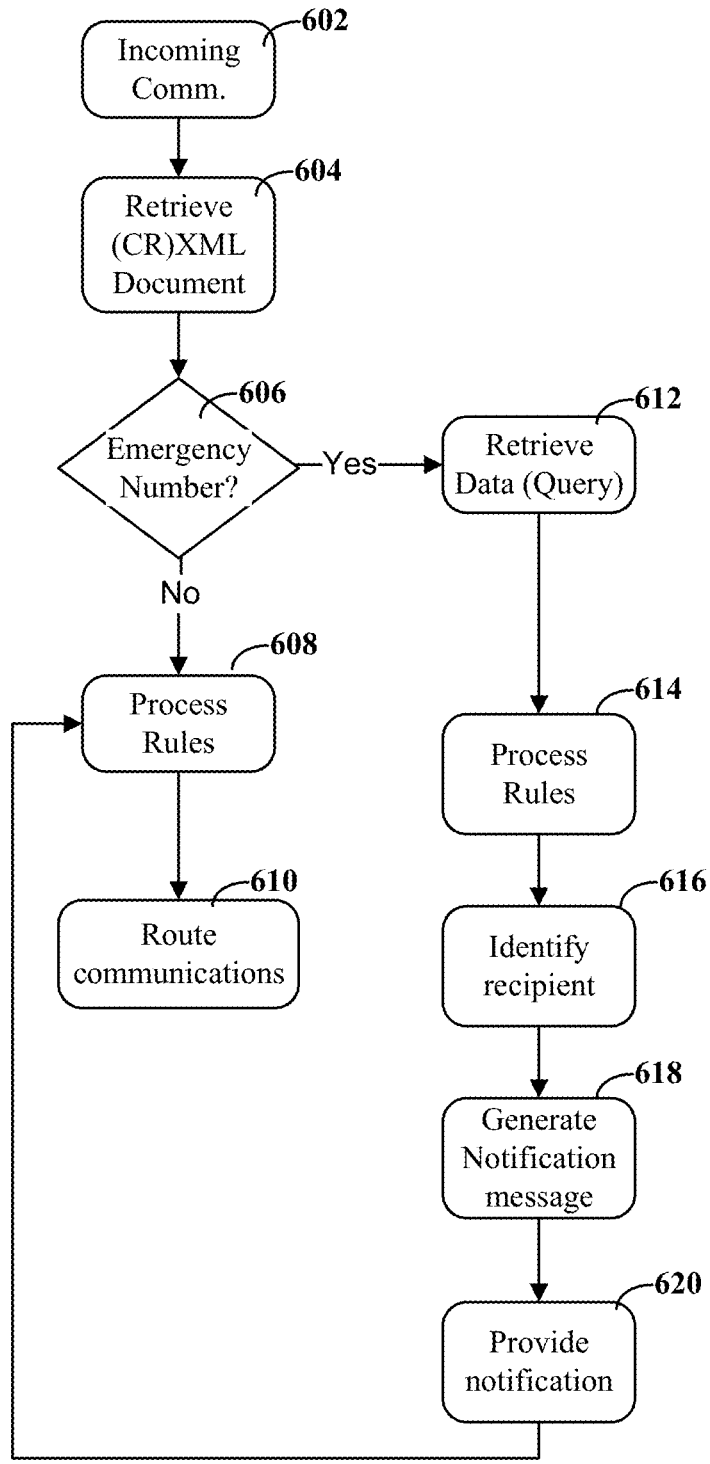
FIG. 6 is a block diagram showing the customization of emergency notifications for communications services, consistent with embodiments of the present disclosure.

FIG. 6 is a flow diagram for controlling communications routing to a receptionist, consistent with embodiments of the present disclosure. The flow begins with an incoming communications, per block 602. While reference is made to an "incoming communications," the communications may originate from a communications endpoint device of a client entity. The incoming communications information provides data about the user contacted and may also include information about the contacting number (e.g., user ID of the user initiating the communications). For instance, the number called may correspond to an emergency number, such as for emergency medical services, law enforcement services, and/or services associated with natural disasters. The called number may correspond to one of multiple accounts that are supported by a receptionist (or by several receptionists), for example, operating on behalf of a client entity subscribing to a set of communications services. In response to receipt of the communications, a communications control engine can access the appropriate communications routing and communications processing rules per block 604. As discussed herein, the rules can be provided from the subscribing client entity in the form of programming instructions written in a high-level programming language, and client-specific control data corresponding to the programming instructions can be stored for receipt and interpretation by the communications control engine.

In particular embodiments, there can also be multiple levels of communications processing rules and optionally with multiple client-specific sets of control data or different sets of instruction sets used in connection with the different respective levels. As a specific example, the communications control engine can use a first (e.g., light-weight) set of programming instructions that functions as a plugin module to the communications control engine. Subsequent communications processing rule levels can use documents written with more complex language(s) that can use a superset of commands relative to the first level (e.g., programming instructions corresponding to the second programming language).

Consistent with certain embodiments, the communications control engine can parse the number contacted, and determine if the number is associated with an emergency service provider at block 606. Numbers associated with an emergency service provider may be stored for identification in response to a query from the communications control engine. If the contacted number corresponds to an emergency number, the method includes retrieving data from external data sources, per block 612. For example, client-specific control data can be retrieved from an external source. For example, the communications control engine might operate by sending requests to a web server and get client-specific control data for processing communications, such as identifying who should receive the emergency notification, and how such notification should be provided. The communications control engine can interpret a received client-specific control data to identify (XML) language building blocks that are then rendered (executed). Each building block can define logic relating to one or more functions, such as functions for voice, communications control, and flow control logic. The requests can include relevant information about the incoming communications, such as the contacted number and the user ID. The XML-type document may define query requests that the communications control engine generates in order to retrieve data from databases or other sources of data. A query could be formatted for consistency with the source of the data (e.g., JSON) to retrieve data from third party application servers or from the communications server provider's cloud database).

The communications control engine processes the rules defined by the XML rules along with any retrieved data, per block 614. For instance, the communications control engine can process rules defined in the client-specific control data to identify recipients to which the emergency notification should be provided at block 616. The communications control engine can then proceed with generating the notification message at block 618, alerting the recipient to the occurrence of the emergency situation. The communications control engine can then provide the notification to the intended recipient in the manner specified by the client-specific control data (e.g., by text, by voice, by email, various combinations thereof, and/or by other methods) at block 620.

Additionally, if the communications control engine identifies that the number contacted is not an emergency number, the communications control engine can process communications processing/communications routing rules at block 608, as specified by the client-specific control data. For instance, the communications control engine can route the communications at block 610, as specified by the client-specific control data.

MORE DETAILED AND/OR EXPERIMENTAL EMBODIMENTS

Consistent with the above-characterized embodiments, various other embodiments are based on implementations which involve alternative features and/or involving a type of programming language which is different than disclosed above for use as part of the above embodiments. Accordingly, the present disclosure is not necessarily limited to specific methods, systems, applications and devices in and stemming from the specific embodiments disclosed herein. Other related embodiments and aspects can be fully incorporated in each such disclosed (contemplated/suggested) embodiment. Some of these aspects and embodiments would be recognized from the following discussion.

In certain embodiments, the client-specific control engines provide client-specific control data to the data communications server(s) via an interface protocol platform that characterizes the format in which the client-specific sets of data are communicated to the data communications server. According to various embodiments, data is communicated via the interface protocol platform using high-level programming language instruction set. The high-level programming language instruction set allows a programmer access to the data communications server(s) (or PaaS computing server(s) providing remote services) by way a controlled and limited set of communications control operations and functions. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control or access the inner workings of the data communications servers.

Consistent with the above discussion, at the client side of the communications services, the client's computer-based processing (e.g., by the client-specific control engine) generates and submits control (routing/data-communication) directives for assessment and use by the communications service provider. In a typical implementation, these directives can be realized using codes or one or more commands (or a script of program-created commands). As examples, such codes or command sets can be implemented using a variety of programming control approaches. These approaches include, for example, a programming language (such as C++, WL, JAVA, HTLM, SQL, etc.) common to both the client-specific control engine and to the communications service provider, which receives the directives (submitted from the client side) for adjusting the communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.).

By using a common interface protocol (e.g., the programming language, codes or command sets) which is understood by the communications service provider, authentication and updating for added (telephony) services is readily achieved automatically and remotely without burdening the communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to embodiments of the present disclosure, the data communications servers can be configured to use different high-level programming languages for different functions, where each programming language has a different set of commands. For example, a first high-level programming language can be used to create documents that control communications routing decisions for high volumes of communications traffic, as might occur at the edge of a communications service provider's system. These communications routing decisions can, for example, identify a particular branch office or an IPBX of a particular customer. The identified IPBX might then have additional documents written to communicate using a second high-level programming language that is tailored toward more specific communications processing capabilities that might be associated with a particular account or another identifiable grouping. The distinction between the two programming languages can be particularly useful in terms of improving the scalability of the system. For instance, the language used for communications routing decisions can be relatively light weight, with fewer commands and capabilities. In particular implementations, the first (communications routing) language can contain a subset of the commands available in the second (communications processing) language.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the data communications servers. Within these constraints, a customer can write XML code that self-describes the building blocks used in the customer's particular application. Another aspect of the communications processing XML is that it allows for various different data structures to be embedded into the XML document or file. For example, a script written in Javascript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial communications routing and the other for providing more complex and specific communications processing functions. In various portions of the present disclosure, the two languages are referred to as either communications processing XML (CPXML) or communications routing XML (CRXML).

The data communications servers providing the underlying function for the PaaS can be configured to utilize a high-level, domain-specific programming language. A particular example language is referred to as Communications Processing eXtensible Markup Language (CPXML). CPXML refers to a communications processing language which defines the message exchange protocol between a communications control server (e.g., an IntraSwitch with a CPXML Engine) and other sources of information, such as databases, web applications, authentication servers, and servers providing various communications-related services. CPXML can allow developers to program communications processing logic or service execution logic with both XML building blocks and JavaScript/TCL, or other scripting languages. In certain implementations, CPXML allows PaaS customer developers to program and integrate communications flow (e.g., as provided by a cloud-based communications service) with customer or third party application servers and databases.

A CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, communications control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the communications server provider's cloud database). This information can then be used to drive communications flow or communications control decisions.

CRXML defines a limited set of commands to the communications routing logic that allows a customer to define how a communications is initially routed. Maintaining the CRXML as a limited set of simple building block commands can help with the efficiency of the communications control switch. For example, the communications control switch can be located at the perimeter of the communications service provider's routing network, which implies that it may be required to handle a large volume of communications. The efficiency in processing the large volume of communications can have a significant impact on the performance of the system.

Consistent with various embodiments, the CRXML documents specify a first level of communications routing and simple communications processing that are carried out by the communications control switch. For example, a communications control switch may provide communications routing options for multiple branch offices or locations and for multiple PBXs that support the branch locations. Each branch and PBX may have multiple customer (user) accounts associated therewith. CRXML documents can be used to determine the routing for a communications by identifying a particular branch location, a particular PBX and particular communications customer account to use in subsequent communications processing and routing. The initial routing decision is indicated by the arrow labelled as "account selection," which shows the passage of control to a communications processing engine.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, engines, device, endpoint device, gateway, system, unit, controller, and the like. In these contexts, and using just one example, the term "block" is or includes a circuit (also sometimes "logic circuitry" or "engine") that carries out one or more of these or related operations/activities (e.g., a communications control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other such circuit-based devices. Moreover, a communications endpoint device (or endpoint) includes a communication circuit and (computer) processing circuits which are configured to establish data communication sessions with other communications endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus for providing data communications services from a data communications server to a plurality of remotely-situated client entities, the apparatus comprising:
   interface circuitry, communicatively coupled to or as part of the data communications server, to send communications to and receive communications from the plurality of remotely-situated client entities via a broadband network; and
   control circuitry, also communicatively coupled to or as part of the data communications server, to
      access a first set of computer-executable commands that are written in a first high-level programming language and that designate or correspond to a first category of communications routing instructions specifically associated with routing instructions particular to and as specified for at least one of the plurality of client entities in a database of communications services to be provided to said at least one of the plurality of client entities as set forth in a communications-services subscription for said at least one of the plurality of client entities, and
      access a second set of computer-executable commands that are written in a second high-level programming language and that designate or correspond to a second category of communications instructions specifically associated with and as specified for said at least one of the plurality of client entities in a database of communications processing functions associated with the communications services to be provided to said at least one of the plurality of client entities; and
   wherein the first and second sets of computer-executable commands are based on a common subset of computer-executable commands including in each of the first and second sets, and wherein one of the first and second sets is received by the interface circuitry via the broadband network from said at least one of the plurality of client entities and is used to indicate communications routing instructions for emergency notifications, provided by the data communications server, on behalf of said at least one of the plurality of client entities.

2. The apparatus of claim 1, wherein one of the first and second categories of communications instructions are used for initial communications routing provided by the server on behalf of said at least one of the plurality of client entities, and the other of the first and second categories of communications instructions are used for directives, control and related communications data for communications services provided by the server on behalf of said at least one of the plurality of client entities.

3. The apparatus of claim 1, wherein the first set of computer-executable commands, as written in the first high-level programming language, pertain to less complex communications-related functions than functions specified by way of the second set of computer-executable commands which are written in the second high-level programming language.

4. The apparatus of claim 1, wherein at least one of the sets of computer-executable commands is client-specific and used to instruct the server to reroute communications to or from communications nodes or endpoints on behalf of said at least one of the plurality of client entities.

5. The apparatus of claim 1, wherein at least one of the sets of computer-executable commands is client-specific and used to instruct the server to generate and send notification messages to at least one predetermined location responsive to emergency numbers being dialed by a communications node or endpoint on behalf of said at least one of the plurality of client entities while at a certain location.

6. The apparatus of claim 1, wherein at least one of the sets of computer-executable commands is client-specific and used to instruct the server to generate and send an email message to a predefined email address in response to an emergency number being dialed by a communications node or endpoint on behalf of said at least one of the plurality of client entities while at a certain location.

7. The apparatus of claim 1, wherein at least one of the sets of computer-executable commands is client-specific and used to instruct the server to generate and send a text message to a predefined address in response to an emergency number being dialed by a communications node or endpoint on behalf of said at least one of the plurality of client entities while at a certain location.

8. The apparatus of claim 1, wherein at least one of the sets of computer-executable commands is client-specific and used to instruct the server to identify a plurality of different emergency numbers that are indicative of different physical locations.

9. The apparatus of claim 2, wherein each of the sets of computer-executable commands are written in a version of XML.

10. The apparatus of claim 1, further including a private branch exchange (PBX) communicatively coupled or integrated physically with the server and wherein the PBX is to support a plurality of data communication or telephone lines.

11. The apparatus of claim 1, further including a private branch exchange (PBX) communicatively coupled or integrated physically with the server and wherein the PBX is to
receive an outbound call from a telephone line via a dialed number;
identify and parse, in response to the call, client-specific control data associated with said at least one of the sets of computer-executable commands and with the telephone line; and
identify the outbound call is being made to an emergency number.

12. The apparatus of claim 1, further including a private branch exchange (PBX) communicatively coupled or integrated physically with the server and wherein the PBX is to
retrieve data by parsing data from client-specific sets, wherein the data specifies an emergency number;
generate, in response to the retrieved data, a notification message for an outbound call in response to identifying a dialed number as corresponding to the specified emergency number; and
route, using the PBX, the outbound call to the dialed number.

13. The apparatus of claim 1, wherein the data communications server is configured and arranged to provide the communication services to end-users by:
communicating data to set up relationships involving the data communications services with the remotely-situated client entities over the broadband network; and
controlling communications routing or data processing decisions for communications, including emergency contact numbers, associated with the data communications services on behalf of the remotely-situated client entities.

14. The apparatus of claim 1, wherein one of the first and second sets of computer-executable commands for the client entity are provided to the data communications server in a programming language that is a subset of the other of the first and second sets of computer-executable commands and that are to be used by the data communications server for providing the data communications services specific to said at least one of the client entities.

15. A method for use in a data communications system, comprising:
receiving from a communications provider server, event data for routed communications, wherein the communications provider server is configured and arranged to provide a database with a set of communication features available to remotely-situated client entities based on a subscription, and wherein the client entity provides the set of communication features and communications routing capabilities to a plurality of end-users;
generating, at a client server associated with a client entity of the remotely-situated client entities and communicatively coupled to the communications provider server, programming instructions, in response to receipt of the event data and in a programming language that is compatible with a first programming language utilized by the communications provider server, wherein the programming instructions include defining a plurality of emergency numbers and recipients of emergency numbers corresponding to geographic locations of the plurality of end-users; and
adjusting the communication features available to end-users of the client entity according to and responsive to the programming instructions and the event data; and
providing an emergency notification to one or more predetermined recipients specified in the programming instructions responsive to an outbound communication to an emergency service and generating, based upon the programming instructions, a notification message for an outbound communication in response to a dialed number of the outbound communication corresponding to one of the emergency numbers.

16. The method of claim 15, further including generating and routing notification messages to a plurality of different recipients responsive to different outbound communications requests wherein the emergency numbers are different depending on correspondence to different geographic locations indicated on behalf of the client entities.

* * * * *